(12) United States Patent
Dick et al.

(10) Patent No.: US 6,687,923 B2
(45) Date of Patent: Feb. 10, 2004

(54) VACUUM RELEASE VALVE AND METHOD (75) Inventors: John Peter Dick, Williamtown (AU); Robert James Dick, Charlestown (AU)

(73) Assignee: Poolside International Pty Ltd., Cardiff (AU)

(*) Notice: Subject to any disclaimer, the term of this patent is extended or adjusted under 35 U.S.C. 154(b) by 21 days.

(21) Appl. No.: 10/048,653

(22) PCT Filed: Aug. 31, 2001

(86) PCT No.: PCT/AU01/01099
§ 371 (c)(1),
(2), (4) Date: Feb. 1, 2002

(87) PCT Pub. No.: WO02/18826
PCT Pub. Date: Mar. 7, 2002

(65) Prior Publication Data
US 2002/0104158 A1 Aug. 8, 2002

(30) Foreign Application Priority Data

Aug. 31, 2000 (AU) .............................................. PR 4357
Jul. 27, 2001 (AU) .............................................. PR 6659

(51) Int. Cl.$^7$ ................................................. E04H 4/12
(52) U.S. Cl. ........................... 4/504; 137/467; 137/526
(58) Field of Search ........................... 4/504, 507, 509; 137/467, 526

(56) References Cited

U.S. PATENT DOCUMENTS

| 1,212,148 | A | * | 1/1917 | Donnelly ..................... 137/526 |
| 5,105,848 | A | | 4/1992 | Kallenbach ............. 137/526 X |
| 5,363,877 | A | | 11/1994 | Frentzel et al. ............. 137/526 |
| 5,682,624 | A | | 11/1997 | Ciochetti ........................ 4/509 |
| 5,822,807 | A | * | 10/1998 | Gallagher et al. ............. 4/507 |
| 5,991,939 | A | | 11/1999 | Mulvey ......................... 4/504 |
| 6,098,654 | A | | 8/2000 | Cohen et al. ............... 137/467 |
| 6,251,285 | B1 | * | 6/2001 | Ciochetti ................... 4/504 X |

* cited by examiner

Primary Examiner—Robert M. Fetsuga
(74) Attorney, Agent, or Firm—Snell & Wilmer LLP (57) ABSTRACT A vacuum release valve and method are defined. The valve 10, 100, 200 is positioned on a line L between a pool suction inlet I and a pump PU for pumping pool liquid from the inlet and along the line L. The valve 10, 100, 200 includes a valve member 24, 108, 214 that is urged by the pump into a sealing position during normal pumping of pool liquid from the inlet to the pump, so that pool liquid does not flow across the valve. When a predetermined level of vacuum is induced in the line, the valve member is moved out of the sealing position by the vacuum so that a fluid is allowed to flow through the valve to release the vacuum.

12 Claims, 6 Drawing Sheets

VACUUM RELEASE VALVE AND METHOD

FIELD OF THE INVENTION

The present invention relates to a vacuum release valve for positioning on a line between a pool suction inlet and a pump for pumping pool liquid from the inlet and along the line, and also relates to a vacuum release method. When the terminology "pool" is used in the present specification it includes swimming pools, spas, ponds, lakes etc., especially when the aforementioned have recreational applications. When the terminology "inlet" is used throughout the specification it can include one or more inlets of various types.

BACKGROUND OF THE INVENTION

Pools of various types are known to have one or more suction inlets where pool water is sucked along a line via a pump to filtration, aeration, chemical treatment and other type of equipment, prior to being returned to the pool via one or more return outlets.

In more recent pool designs, some of the suction inlets are positioned at a bottom or lower region of the pool. Very recently developed pool cleaning systems, known as in-floor cleaning systems, have one or more suction inlets which suck pool water therethrough and any debris and pollutants entrained therein are cleaned from the water by being pumped to a filtration and/or treatment station.

Some of these inlets have relatively small opening areas and, when large volumes of water are being pumped therethrough, very high suction forces at the inlet can be induced. These forces can be so extreme that if a pool user contacts the inlet by any part of their body, they can be held thereagainst, unable to be dislodged even by excessive force. Where the suction inlet is located at or adjacent to a bottom of the pool, the user can thus be submerged with the risk of drowning, grievous bodily harm etc.

U.S. Pat. No. 5,991,939 discloses a pool safety valve which is designed to bleed air into the suction line of a pool when the suction pressure exceeds a predetermined value. The arrangement disclosed is, however, somewhat complex in that a pair of opposing valve slide plates, which are normally biased apart by a spring arrangement, must be urged away from opposing sealing end plates by the suction force in the pool suction line. The valve of U.S. Pat. No. 5,991,939, because of its relative complexity, is somewhat complex to manufacture and operate and would therefore be relatively expensive.

U.S. Pat. No. 6,098,654 also discloses a flow blockage suction interrupt valve to instantaneously introduce atmosphere into a suction piping system of a pool when a dangerous vacuum condition is detected. The valve of this patent is even more complex in construction and operation than that of U.S. Pat. No. 5,991,939. In the valve of U.S. Pat. No. 6,098,654, vacuum is applied to a spring loaded trigger pin, which draws that trigger pin down in the valve, and this in turn releases a locking mechanism between a main valve piston and the remainder of the valve. Once this locking mechanism is released, a spring forces the main valve piston downwardly, and this allows ambient air to flow through the valve, past the piston and into the swimming pool circulation system. Because of its complexity and the close tolerances required, this valve would be quite costly to manufacture and is complex in operation.

Increased complexity often means that a valve is more likely to seize or fail in use.

SUMMARY OF THE INVENTION

In a first aspect the present invention provides a vacuum release valve for positioning on a line between a pool suction inlet and a pump for pumping pool liquid from the inlet and along the line, the valve including a valve member that is urged by the pump into a sealing position during normal pumping of pool liquid from the inlet to the pump and such that the pool liquid does not flow across the valve;

wherein, when a predetermined level of vacuum is induced in the line, the valve member is moved out of the sealing position by the vacuum so that a fluid is allowed to flow through the valve to release the vacuum.

In the valve of the present invention, the valve member is urged by the pump into a sealing position during normal pumping of pool liquid from the inlet to the pump. This means that a very simple valve and valve member configuration can be adopted and the complexities of prior art configurations avoided. For example, a simple valve ball and valve seat arrangement can be employed (as described below).

In one preferred application of the invention in a swimming pool, when or if a user blocks the suction inlet by a part of their body (or if other debris blocks the inlet) whilst the pump is operating, the pump continues to pump the liquid in the line thus inducing a vacuum (typically a partial vacuum) in the line. The level of vacuum induced then typically rapidly reaches the predetermined level. The valve of the present invention can release that vacuum by allowing a fluid (eg. a gas) to flow back into the line, thereby breaking the vacuum and releasing the user (or debris). In effect, the flow of fluid can either cause the pump to lose prime and hence suction force (eg. when the fluid is a gas) or can reduce the pressure in the line to a level where the user (or debris) can be freed from the inlet (eg. when the fluid is a liquid).

The terminology "predetermined level" does not equate as such with any specific relative or even an absolute level of vacuum, but is typically a level of vacuum reached when there is a blockage at the inlet. However, in other applications partial blockage may cause the predetermined level of vacuum to be reached. Thus the terminology should be interpreted broadly.

It should be appreciated that the invention has application with suction lines in a wide variety of pools including natural and artificial ponds (eg. to prevent fish and other marine life from being harmed), in spas, and even in commercial applications. Thus, when "pool liquid" is referred to, it is not necessarily limited to water, and could be bodies of organic fluids etc.

Typically the valve allows a flow of fluid in the form of air or other ambient gas thereacross to release the vacuum, although in some embodiments the flow of fluid may also be a flow of liquid (eg a restorative side water flow from a separate source). However, for ease and cost of operation it is most preferred that the flow of fluid is a flow of air (typically atmospheric, ambient air, being readily available).

Preferably the valve is a one way valve, more typically a one way ball valve, with the valve member being a ball. Thus, in a normal pool liquid pumping operation, the ball seals fluid flow thereacross by sitting against a valve seat, and is only moved away from the seat when the predetermined level of vacuum is induced in the line, thereby enabling the fluid flow.

In one preferred variation the valve houses a plurality of valve members, typically a plurality of ball valve members.

This enables the valve to provide for multiple re-uses, prior to the valve having to be dismantled for servicing. In this regard, each ball valve member can be separated from an adjacent ball valve member by a separator pin.

Typically the plurality of ball valve members are aligned one above the other, linearly above the valve seat. Preferably, when the predetermined level of vacuum is reached, the ball sitting at the valve seat is drawn past the seat and preferably into a ball capturing chamber. In accordance with the present invention, rather than having to discard the valve or dismantle the valve to reset the ball at the seat, a user can remove the lowermost separator pin, the next uppermost ball can then drop into place at the seat (eg. under the influence of gravity) and the valve is therefore ready for use again.

Preferably, when the predetermined level of vacuum is reached, the ball sitting at the valve seat is drawn past the seat and into a ball capturing chamber, and wherein an upper part of the valve can be rotated relative to a lower fixed part of the valve and, at a given rotational position, the upper part can then be moved downwardly relative to the lower part such that the valve seat passes over the ball in the ball capturing chamber to once again position the ball at the seat, and the upper part can then be moved upwardly relative to the lower part so that the valve is again ready for use.

Preferably the upper part is urged downwardly against a spring positioned between the upper and lower parts, which spring tends to urge the upper part away from the lower part and move it up once the ball has again been positioned at the seat.

Preferably the valve is located in an auxiliary line located laterally to the line extending between the inlet and pump. As such, when pool liquid is pumped past the auxiliary line a partial vacuum is also induced in the auxiliary line. Typically the valve seat is positioned such that this partial vacuum has the effect of drawing the ball against the seat, enhancing sealing thereat.

Preferably the valve is also oriented such that when the fluid is caused by the vacuum to flow across the valve the ball is forced past the seat. In this regard, the ball is, in effect, sucked out of its sealing position at the seat by the suction force induced in the line, and is moved to a position which then enables fluid to be drawn across the valve to the pump, thus releasing the vacuum.

Preferably the seat is adapted to only allow the ball to move therepast once the predetermined level of vacuum has been induced in the line. Preferably the seat is formed from a resilient but deformable material, which deforms as the ball passes and restores to its former shape once the ball has passed.

Preferably the seat is in the form of an annular inwardly protruding shoulder or sealing ring in the valve, which preferably engages an underside of the ball such that the ball can only move therepast when the predetermined level of vacuum is reached. Thus, preferably the retention shoulder is oriented such that, for normal pump operation, the ball is not moved out of sealing engagement with the seat.

As an alternative to the retention shoulder arrangement, the ball can be spring loaded, or another retention system such as plurality of leaf springs etc. can be employed, but in any case a sealing arrangement is still employed.

In a second aspect the present invention provides a method of using a valve to release a vacuum induced in a line between a pool suction inlet and a pump for pumping pool liquid from the inlet and along the line, the valve having a valve member that is held in a valve closed position by the pumping of pool liquid in the line, the member being movable from the closed position to an open position, the method including the step of facilitating valve member movement to the open position, to thereby allow a flow of fluid into the line, when a predetermined level of vacuum is induced in the line, to in turn release the vacuum.

Preferably the flow of fluid is a flow of air or other gas, and preferably the method is facilitated by a vacuum release valve according to the first aspect of the invention (and its various preferred forms).

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 6A to 12A show side (typically sectioned) elevations of various components of a second vacuum release valve in accordance with the present invention, with FIGS. 6B to 12B showing either plan or underside plan views respectively of those components, and with FIGS. 11C and 12C showing details of the respective components in FIGS. 11A and 12A respectively;

MODES FOR CARRYING OUT THE INVENTION

Figure 1:
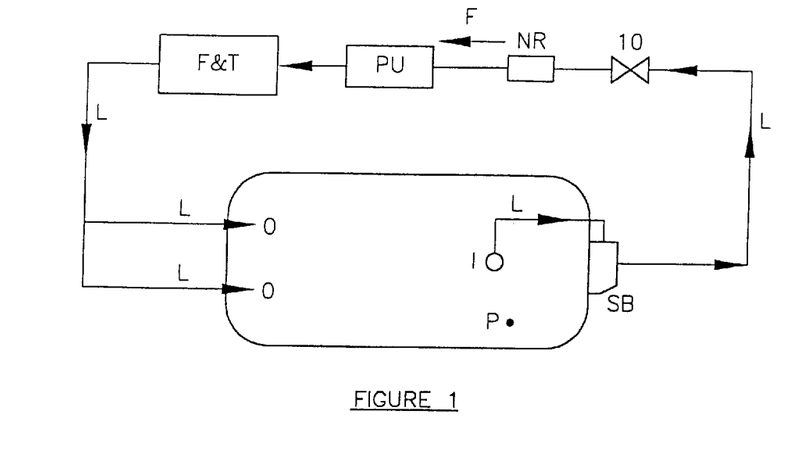
FIG. 1 shows a schematic flow diagram illustrating the flow of pool liquid in a closed return circuit and including a vacuum release valve in accordance with the present invention.

Referring firstly to FIG. 1, a vacuum release valve 10 is positioned in/on a flow line L for a pool P. As stated above the pool P can be any pool or pond type including spas, ponds, natural and artificial bodies of water etc. However, the apparatus described hereinafter is most suitable for use in swimming pool applications.

Pool liquid (typically water) is pumped through the flow circuit via pump PU, with water being drawn into the line L at suction inlet I, then passing via a skimmer box SB and the valve 10, and then via a non-return valve NR to the pump. From the pump, the water is passed via a filtration and/or treatment unit F & T, and is then returned to the pool by one or more outlets O.

The valve 10 in accordance with the present invention enables a vacuum release or vacuum break function, should the inlet be fouled or blocked in any way. Most importantly the vacuum release function operates should a human user or other sizeable living organism block or have part of their body sucked against the inlet in potentially perilous circumstances whilst the pump is operating.

In this regard, should the inlet become blocked for any of these various reasons, whilst the pump is continuing to operate, then water in line L continues to be drawn by the pump, but because of the blockage at inlet I, the advancing head of water creates a vacuum (typically a partial vacuum) therebehind, thus increasing the suction force at inlet I, and making it more difficult for the blocking member to be released. Valve 10 in accordance with the present invention is so designed and configured that once that vacuum reaches a predetermined level (in practice this occurs rapidly after blockage) the valve opens to enable fluid to be discharged into line L to release or break the vacuum.

The fluid is typically an ambient gas such as air that flows across the valve and breaks the prime in the pump. However, if the fluid is a liquid (such as water) it can flow into the pump and, in effect, nullify the suction force in line L to a level sufficient to release the blockage at the inlet, thus breaking the vacuum.

Figure 2:
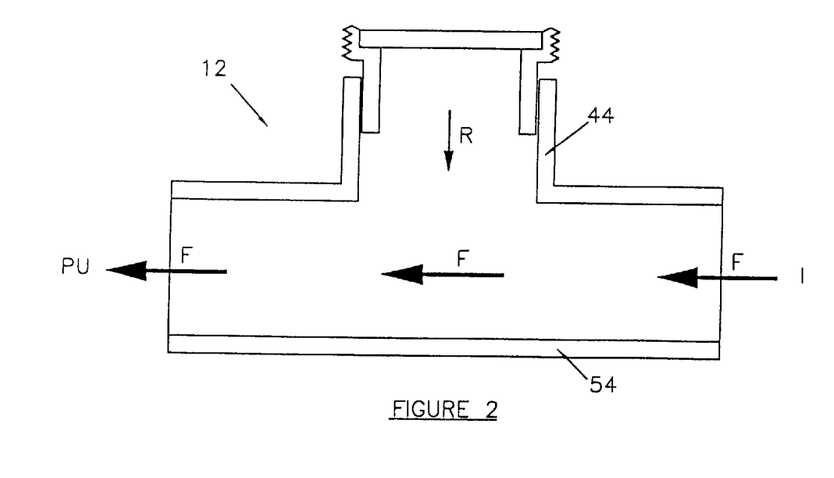
FIG. 2 shows a side schematic sectional elevation of a first valve housing for use in the flow circuit of FIG. 1, and schematically illustrating fluid flow pathways therethrough.

FIG. 2 illustrates a valve housing 12 for valve 10 and illustrates liquid and fluid flows through the housing, with arrows F indicating the normal flow of pool liquid through the housing from the inlet I via line L to the pump PU. The arrow R indicates the flow of a fluid through the valve housing into the line L to release any vacuum induced in the line L.

Figure 3:
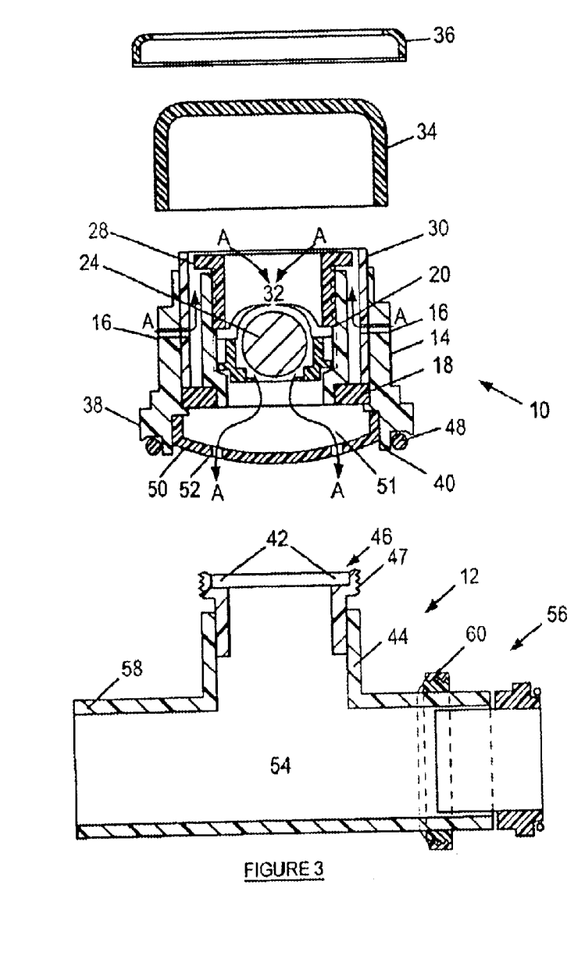
FIG. 3 is a partially exploded, partially sectioned side sectional elevation of a first vacuum release valve in accordance with the present invention, also illustrating the valve housing of FIG. 2.
Figure 4:
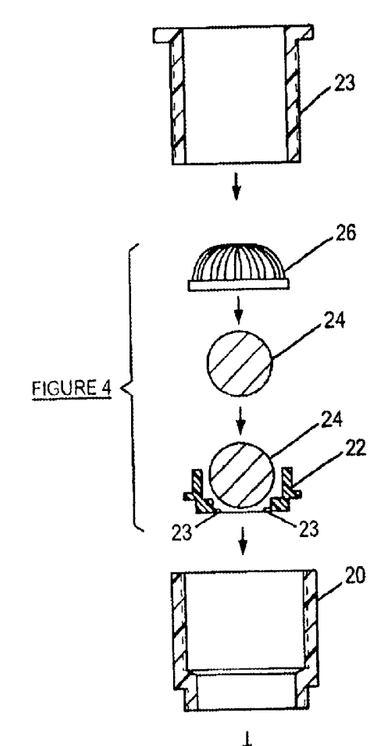
FIG. 4 is a side view in partially sectioned detail of the valve ball retention mechanism of FIG. 3.
Figure 5:
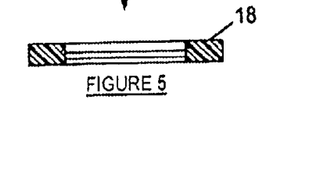
FIG. 5 is an exploded sectional side elevation of a first valve ball housing, being part of the valve of FIG. 3.

Referring now to FIGS. 3 and 4, the valve 10 is shown in greater detail and its operation will now be described. The valve 10 includes a valve body 14 having a plurality of (for example 3) equidistantly spaced passages 16 defined therethrough, each for allowing a flow of fluid (typically air) into the valve. Referring also to FIG. 5, a supporting base plate 18 is mounted in the valve body 14 and a holder 20 is screw fitted into this plate. A sealing member 22 is then positioned in holder 20, the member having an inwardly projecting annular shoulder 23 defined at its lower opening for retaining (seating) a valve ball 24 thereagainst in a sealing arrangement. The valve ball is also housed in member 22 as shown. The shoulder can include radial cuts or separations therein to define a plurality of tabs or fingers engaging against the lower side of ball 24 (as shown in FIG. 4) providing that a seal is still defined. The shoulder is designed to prevent the valve ball from being sucked therepast by normal pump operative suction force. However, as described below, when the suction force at the ball exceeds the normal pump suction force by a predetermined amount, then the shoulder deforms to allow the ball to move therepast.

A restraining cap 26 is located on top of member 22 to cover the ball 24 and hold it in place as shown. The member 22 and cap 26 are then held within holder 20 by a retaining nut 28 which is screwed down into holder 20 until it clamps against the cap and sealing member combination. The assembled valve arrangement is held within the body 14 via a hollow retaining cylinder 30 which has holes formed therethrough that align with passages 16 as shown. The resulting assembled arrangement has a central fluid flow passage 32 defined therethrough which is closed as appropriate by valve ball 24 (described hereafter).

The upper end of the valve body is closed by a weather cap 34 which fits over the exposed end of cylinder 30. A union nut 36 is fitted around the outside of the valve body and is slid down over the body until it sits against annular projecting shoulder 38.

A lower skirt 40 of the valve body is sized to fit snugly within recess 42 of an auxiliary line in the form of valve housing stem 44, until the underside of shoulder 38 abuts the stem upper end 46. When the valve body has been located in stem 44, the union nut is screwed onto external threading 47 on the stem end to lock the valve body to the valve housing. In this regard, to facilitate a fluid tight seal, an O-ring 48 can be located at the underside of shoulder 38 to be compressed between the shoulder underside and the stem upper end.

The skirt 40 also has an end cap 50 fitted therein to define a chamber 51 in the end of the valve body 14. The cap 50 has a plurality of fluid outlet passages 52 defined therein from which a fluid stream A (typically air) passing through the valve can be discharged into the interior of stem 44.

The valve housing 12 further includes a main pipe section 54, and both the right hand end 56 and left hand end 58 of the main pipe section (only the right hand end is shown in detail in FIG. 3) are adapted for having the line L coupled thereto (eg by a union nut 60 that is screwed onto an external thread of the line L (not shown)).

When assembled, pool liquid typically flows through the main pipe section 54 as a stream F (ie as drawn by the pump PU). This flowing liquid also induces a partial vacuum in stem 44, which, in addition to gravity, helps to draw the ball 24 against the shoulder 23, thus enhancing the seal. Pool liquid is prevented from flowing through the valve 10 because the central passage 32 is closed by the valve ball 24 (ie the valve ball is held against the sealing member shoulder 23 by normal operating suction resulting from stream F and is also maintained in place by the restraining cap 26).

Should the inlet I become blocked during pump operation for whatever reason, then the continued action of the pump continues to extract liquid from the line L and through the valve housing 12. As no further liquid can flow in via the inlet (ie because of the blockage) then a vacuum (typically a partial vacuum) is induced in the line L. The continued operation of the pump then makes removal of the blocking object, (eg. a user, debris etc.) extremely difficult, because of the additional suction force created by the vacuum.

This suction force is transmitted via the line L to the valve. The additional suction typically rapidly reaches a predetermined level over and above the normal pump suction and hence causes ball 24 to be sucked downwardly, moving past the inwardly projecting shoulder 23 (which is deflected/deformed downwardly but which typically returns to its original position once the ball has moved therepast). Ultimately, the ball drops into the chamber 51, thereby opening passage 32 to fluid flow. In this regard, a stream, usually an air stream A, can then pass through the valve from the valve surroundings and via the passages 16. The stream A then passes through central passage 32, and ultimately exits the valve by outlet passages 52. This stream of fluid (depicted by arrow R in FIG. 2) restores the normal pressure in line L, breaking or releasing the vacuum induced in the line and enabling the body or debris attached at inlet I to be readily released therefrom.

The use of sealing member 22 is preferred because of its durability. Also it can be easily formed from a non corrodible material (eg an injection mouldable plastic). This optionally enables the shoulders 23 to be defined as a series of discrete inwardly projecting tabs or fingers to further facilitate deformation/deflection and then restoration as the ball 24 moves therepast. However, the sealing member 22 can also be replaced by an appropriately formed sealing spring, for example, that extends upwardly from cap 50 and sealingly engages against the underside the valve ball 24. A helical spring can be employed that is formed from a non corrodible material (eg stainless steel), or one or more leaf springs or other types of biasing member can be used in conjunction with a sealing arrangement.

Another advantage that follows from employing the sealing member 22 is that the valve ball, once released from the sealing member, stays permanently released and is not urged back up into a sealing arrangement. This, on the other hand, might occur with a malfunctioning spring, or where the suction pressure is only partially overcome. In other words, use of the sealing member as described provides an in-built failsafe feature.

Figure 6A:
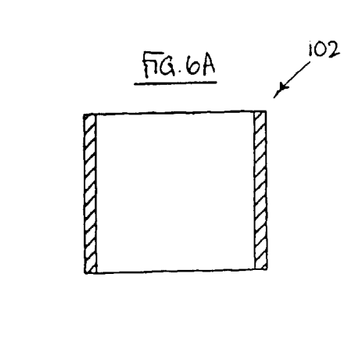

In a typical operation of the first valve embodiment, once the ball has been urged out of its original position, the user must either replace the valve entirely or disassemble the valve and replace various components thereof (eg. member 22). However, referring now to the valve of FIGS. 6 to 13, a second valve embodiment will be described where, once a first ball has moved past the sealing member, further valve balls within the valve can successively be moved to replace that valve ball, without the user having to replace or disassemble and service the valve, until all supply of valve balls within the valve have been used up.

Figure 6B:
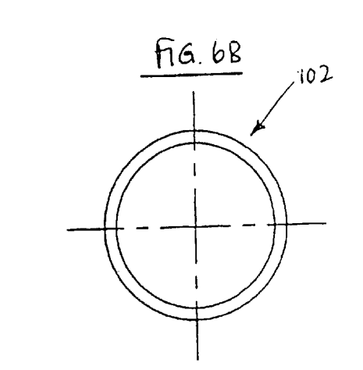
Figure 7A:
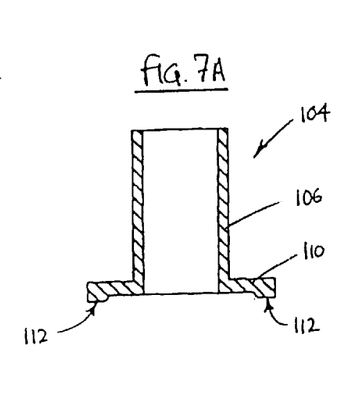
Figure 7B:
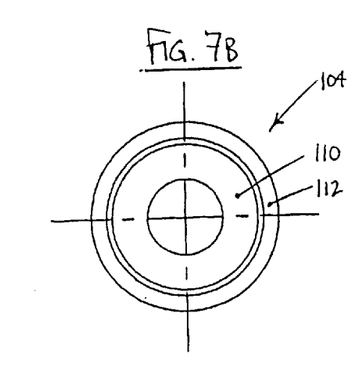
Figure 8A:
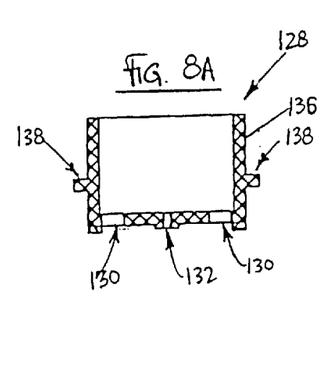
Figure 8B:
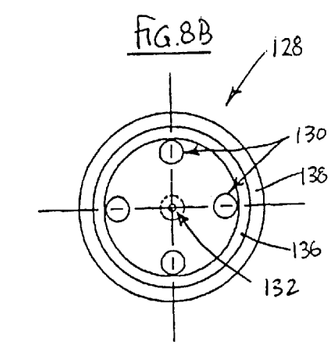

The components of the second valve embodiment will firstly be described and then reference will be made to the assembled valve embodiment. The second valve 100 (FIG. 13) includes a cylindrical cap extension piece 102 (FIGS. 6A and 6B). The cap extension piece maintains a sealing ring 104 (FIGS. 7A and 7B) in place within the valve. The sealing ring 104 has a tubular body portion 106 into which ball valves 108 (FIG. 13) are loaded. A circumferential flange 110 projects outwardly from a lower end of the body portion 106, and an annular step 112 protrudes downwardly from the periphery of flange 110. This step retains a ring-shaped valve seat 114 as described below with reference to FIG. 13.

Figure 9A:
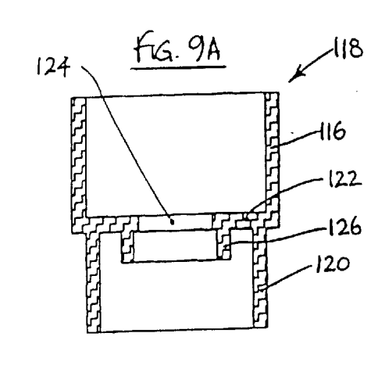
Figure 9B:
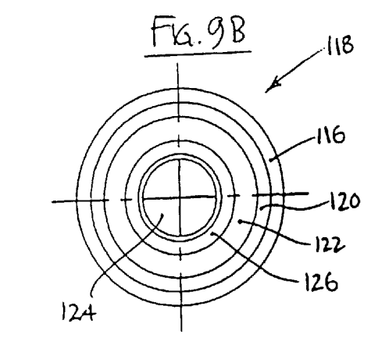
Figure 13:
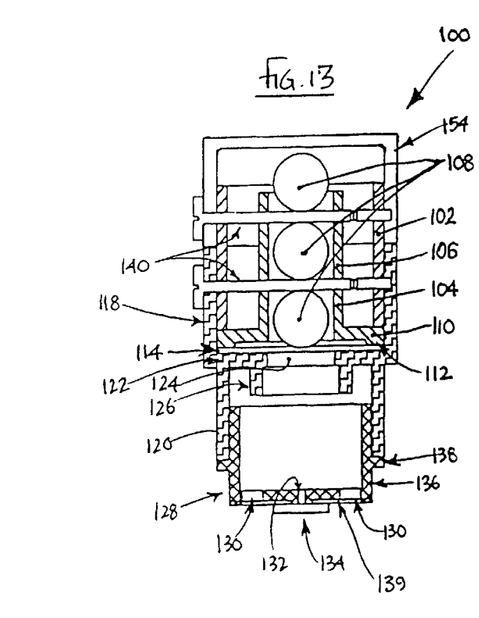
FIG. 13 shows an assembled cross-sectional elevation of the second vacuum release valve in accordance with the present invention.

The external diameter of the cap extension piece 102 and the sealing ring circumferential flange 110 are set such that they fit snugly within an upper part 116 of second valve body 118 (the valve body being illustrated in FIGS. 9A and 9B). The valve body has a lower part 120, which is inset with reference to the upper part and is separated therefrom by an internal wall 122. The seat 114 is retained between the internal wall and annular step 112 of sealing ring 104 (as shown in FIG. 13).

A central opening 124 is defined in the internal wall 122, with a cylindrical skirt 126 projecting downwardly from the internal wall and surrounding the lower side of central opening 124. The opening 124 and skirt 126 provide a guide passage for a ball that is drawn past seat 114 (i.e. when a suction force is applied to the valve).

Mounted to the lower part 120 of the valve body 118 is an internal breather member 128. The bottom wall of the breather member is provided with four equidistantly spaced holes 130 for allowing a flow of fluid through the valve. A central pinhole 132 is also provided in the bottom wall of the breather member 128 for receiving an internal breather pin 134 therein (see FIGS. 10A and 10B, and FIG. 13). Protruding out from the internal breather member sidewall 136, intermediate the top and bottom of that wall, is a circumferential retaining flange 138, which abuts the underside of valve body lower part 120 so that the breather member 128 can be affixed thereto (e.g. by adhesive, by screw mounting, etc.)

Figure 10A:
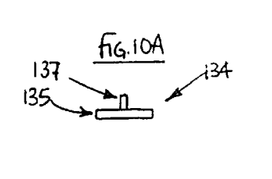
Figure 10B:
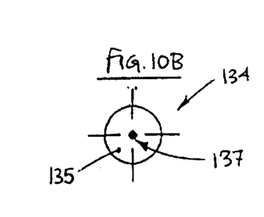

As indicated above, FIGS. 10A and 10B depict the internal breather pin 134. The breather pin has an enlarged head 135 and a short shank 137, the shank fitting into central pinhole 132. The function of the breather pin is to locate an internal breather seal 139. The breather seal functions to prevent the ingress of pool suction water into the valve when backpressure is applied to the valve (eg. by the pump).

Figure 11A:
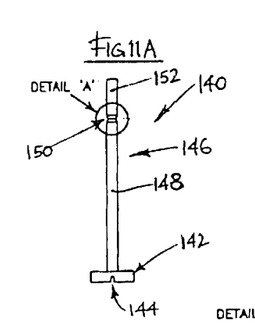
Figure 11B:
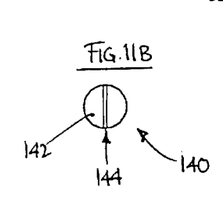
Figure 11C:
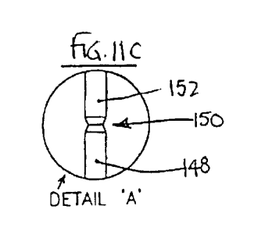

FIGS. 11A and 11B depict one of the retaining pins 140 used in the second valve in accordance with the present invention. The retaining pin head 142 has a slot 144, typically for receiving a screwdriver therewithin. Pin shank 146 comprises a long, round (in cross-section), and in-use rotatable section 148 connected, via a snap region 150, to a short in-use fixed section 152. FIG. 11C shows the snap region 150 in detail. When each retaining pin 140 is mounted in the valve, the short section 152 is fixed against rotation, whereas the long section 148 is able to be rotated. Thus, when a user inserts a screwdriver into slot 144 and rotates it, the pin snaps at region 150, enabling the bulk of the pin shank to be removed from the valve (thus freeing an adjacent valve ball 108—described below).

Figures 12A, 12C:
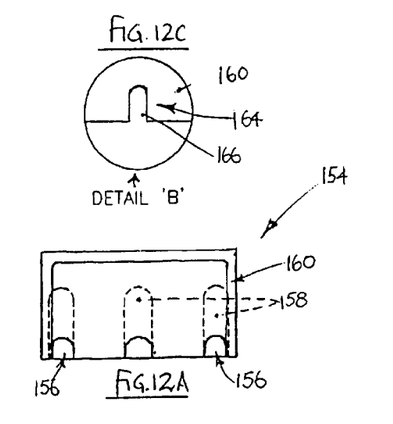
Figure 12B:
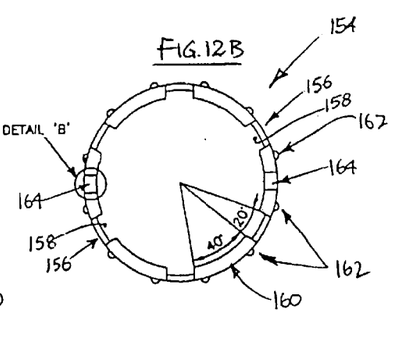

Referring now to FIGS. 12A to 12C the second valve vent cap 154 has a plurality (typically six) equidistantly spaced air vent holes 156 extending therearound, each hole communicating with an air vent channel 158 extending up into the cap. The vent channels enable the air vent holes to communicate with the cap interior once the cap is fitted onto the valve.

The cap sidewall 160 is provided with a plurality of elongate ribs 162, typically equidistantly spaced therearound. The ribs allow for a sealing tape to be wrapped around the cap, once fitted on the valve, and prevent the tape from blocking the air vent holes 156. The ribs also prevent the inadvertent sealing of the cap at the valve when material is wrapped around it in an attempt to seal it. Two opposing pin slots 164 are also defined in the cap sidewall 160, with each slot having a lower square section 166 (see detail in FIG. 12C). The length of slots 164 is greater than the length of holes 156. These slots enable the upper retaining pin 140 to be fitted to valve body 118 prior to the cap 154 being fitted to the valve.

Typically the short section 152 of pin 140 is chemically welded to the cap 154 at slot 164, preventing its rotation within the slot. As an alternative or in addition to chemical welding, the short section 152 can be provided with a square cross section, such that it fits snugly within the square section 166 of slot 164, thereby preventing its rotation therewithin. The rotatable section 148, is circular in cross-section and rotates within its respective slot 164. Accordingly, rotation of the pin head 142 causes the pin to snap at 150, allowing the pin head and shank long section 148 to be removed from the valve. In this regard, the long section may also be threaded to facilitate the initial fastening of the pin in the assembled valve.

FIG. 13 shows second valve 100 in an assembled configuration. As can be seen, three valve balls 108 are positioned within the assembled valve, separated by two retaining pins 140. The lowermost valve ball 108 sits against seat 114 in a sealing arrangement (akin to the sealing arrangement described for the first valve 10) and is held thereat by a partial vacuum induced by the liquid passing stem 44. The lowermost pin 140 typically does not function to retain the lowermost ball 108 against seat 114. The valve functions as a one-way valve, but the ball 108 is sealed at the seat 114 partly by gravity and partly by vacuum caused by pool suction water flowing in line L.

Typically the valve 100 is positioned in/on a flow line L for a pool P in the same manner as valve 10. Thus, should the inlet become fouled or blocked in any way, the lowermost valve ball 108 is sucked past seat 114, and passes through opening 124, skirt 126 and into the breather member 128. However, rather than the user having to dismantle the valve to reset ball 108 into its original sealing position, the user simply removes the lowermost retaining pin 140 (i.e. by screwing head 142, detaching section 148 from fixed section 152 and removing the head and the long section of the pin from the valve. This enables the next uppermost ball valve to drop into position on the seat 114. The valve is therefore operable again for normal pumping. When, once the second ball valve has been sucked past the seat 114 and into the internal breather member, the uppermost retaining pin can be removed to release the uppermost valve ball to again drop down and sit against the seat 114.

This arrangement extends the useable life of the valve and means that the user does not have to replace the valve after each vacuum release operation thereof.

It should be noted that, once the seated ball has been sucked into member 128, air is able to flow into the valve via air vent holes 156, air vent channels 158, then into the underside of the cap 154, and thence past the two uppermost balls 108, flowing between those balls and the tubular body portion 106. The air then flows through seat 114, through central opening 126, into the breather member 128, and then out into line L via holes 130.

Usually the valves 10, 100 are located adjacent to the pump (eg in a pump and filter housing) to be located out of the way of tampering or other interference.

Typically most of the components of the valve are formed from a plastics material (optionally an injection mouldable plastic). Typically the valve ball(s) are formed from stainless steel or similar non-corrodible material.

Referring now to FIGS. 14 to 25, where like reference numerals denote similar or like parts, a third valve embodiment will now be described. In this embodiment, the valve is reusable, in the sense that the valve ball can be used a number of times. More particularly, an upper part of the valve is movable with respect to a lower part of the valve, the valve ball initially being seated in the upper part of the valve, and being drawn by suction into the lower part of the valve. The upper part can then be moved into the lower part to reseat the ball therein.

Some of the valve components are identical to the valve described in FIGS. 6 to 13. In particular, the components shown in FIGS. 6, 10 and 12, namely, the cap extension piece 102, the breather pin 134 and the cap 154 are identical. However, the remaining components differ and valve 200 will therefore now be described.

Figure 25:
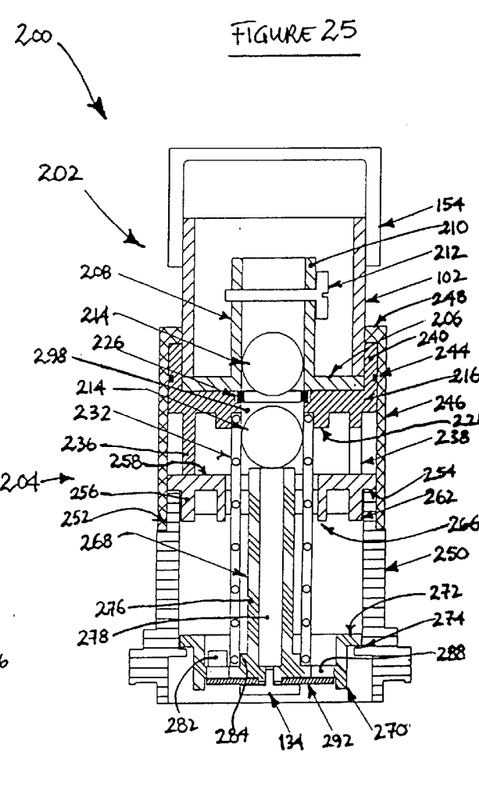
FIG. 25 shows an assembled cross-sectional elevation of the third vacuum release valve in accordance with the present invention.

Referring firstly to FIG. 25, the valve generally comprises an upper part 202 which is movable with respect to a lower part 204. In this regard, in a normal mode of operation of the valve, the upper part has the orientation as depicted in FIG. 25, and in this orientation the upper part cannot be moved downwardly with respect to the lower part. However, the upper part can be rotated (typically anticlockwise) with respect to the lower part and, as described below, the extent of this rotation is delimited by appropriate stops to a predetermined maximum. When the upper part has been rotated to this predetermined position, it can then be moved downwardly with respect to the lower part, telescoping thereinto. This telescoping movement is also delimited, and the lowermost position of the upper part corresponds with a ball retrieval (or recapture) position, so that when the upper part is returned to its original (start) position, it has recaptured the ball. This procedure will be described in detail below, after first describing the components of valve 200.

Figures 19, 21:
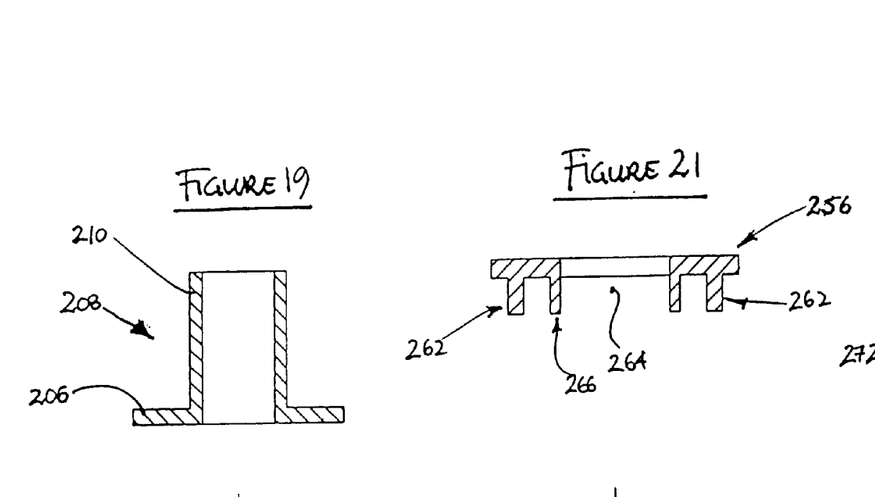
Figures 20, 22:
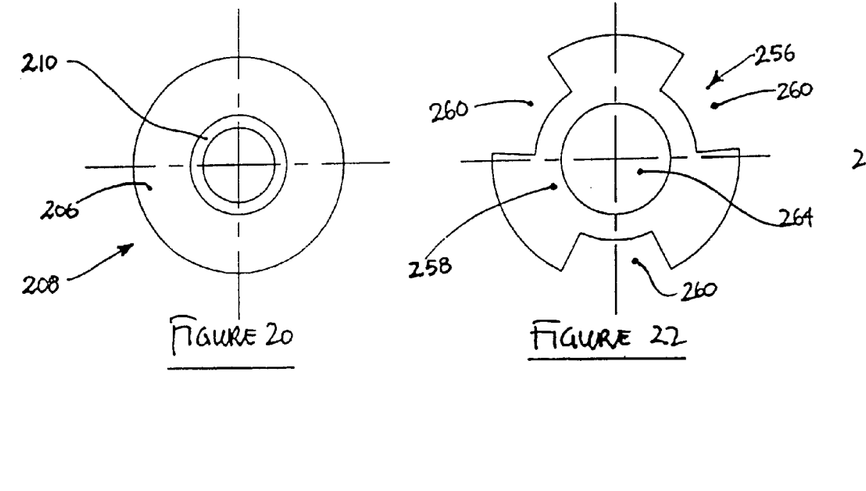

The upper part 202 includes cap 154 which is attached to cap extension piece 102. The cap extension piece is in-turn affixed at its lower end to the circumferential flange 206 of sealing ring 208 (FIGS. 19 and 20). The sealing ring 208 is similar to the sealing ring 104 of FIG. 7, but in this third valve embodiment it does not include an annular step 112 for retaining the valve seat. Rather, it has a planar base which functions as described below. The sealing ring has an upstanding body portion 210. As shown in FIG. 25, a retaining pin 212 is inserted through the body portion 210 to retain a ball valve 214 in the sealing ring during transportation and installation of the valve.

The valve upper part 202 further includes a reset slide 216 (FIGS. 16 to 18) which includes an upper cavity 218 into which a combination of the cap extension piece 102 and sealing ring 208 is received. The circumferential flange 206 of the sealing ring is affixed at its underside to the reset slide when mounted in the upper cavity 218. A central horizontal wall 220 of the reset slide has a stepped central passage 222 therethrough, the step defining an annular ledge 224 into which a valve seat 226 (FIG. 25) is received. As shown, the planar underside of the sealing ring 208 retains the valve seat 226 within the stepped central passage and against the annular ledge 224. The valve seat 226 can either be fixed in position at the ledge or can be a freely movable, self-centreing O-ring. Typically the valve seat is made of a deformable material, such that the ball valve 214 can be urged therepast when a predetermined level of vacuum is caused in the line L.

Figure 17:
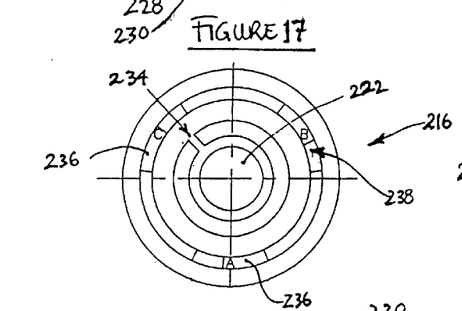
Figure 18:
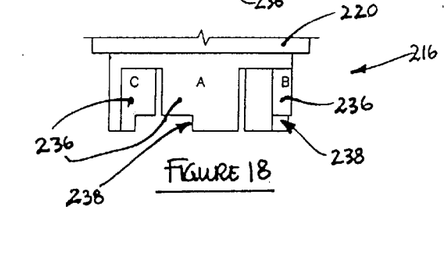

Protruding downwardly from wall 220 is an annular flange 228, surrounding the stepped central passage and defining, on an opposing side of the annular ledge 224, a second annular ledge 230. This second annular ledge receives and supports the upper end of a helical spring 232 (FIG. 25) the function of which is described below. As shown in FIG. 17, the annular ledge also has a gap 234 defined therein into which a hooked end of the spring 232 can be received to fasten the spring to the reset slide 216 when it is rotated (as described below).

Figure 16:
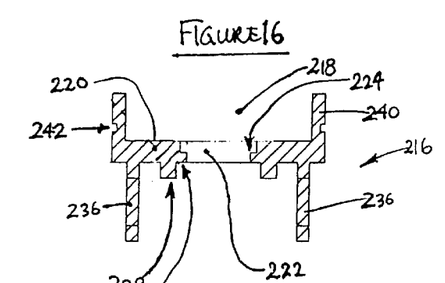

Projecting downwardly from the wall 220 are three evenly spaced reset plates 236 A, B and C. The reset plates are each inset from the circumference of the reset slide. Each reset plate has a latching recess 238 defined therein, the function of which is described below.

An upper circumferential side wall 240 of the reset slide includes a circumferential notch 242 defined therein, and into which a sealing O-ring 244 (FIG. 25) is fitted when the valve is assembled. This O-ring provides a seal between the valve upper part 202 and lower part 204 when the valve is in operation, and facilitates a smooth movement of the upper part with respect to the lower part during valve reset (ie. during rotation and sliding of the upper part with respect to the lower part).

Thus, the valve upper part 202 includes cap 154, cap extension piece 102, sealing ring 208, retaining pin 212, reset slide 216, valve seat 226 and O-ring 244. As described above, this valve upper part can be rotated and slid telescopically as a unit with respect to the valve lower part 204.

Figure 14:
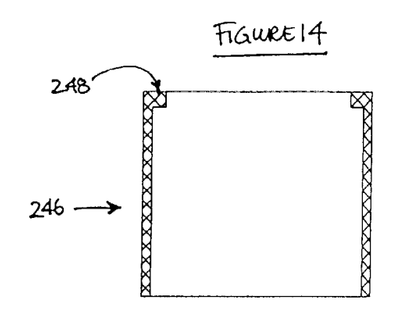
FIGS. 14, 16, 19, 21 and 23 show side sectional elevations of various components of a third vacuum release valve in accordance with the present invention, with FIGS. 15 and 17 showing underside plan views respectively of FIGS. 14 and 16, and with FIGS. 20, 22 and 24 showing plan views respectively of FIGS. 19, 21 and 23, and with FIG. 18 showing a partial side elevation of the component of FIGS. 16 and 17.
Figure 15:
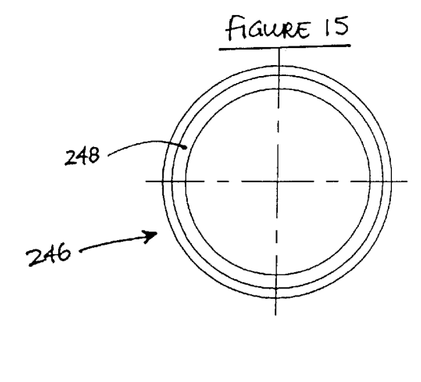

The valve lower part 204 includes a slide housing 246. The slide housing is essentially a cylindrical piece (as shown in FIGS. 14 and 15) but includes an inwardly projecting annular flange 248 at its upper end, which retains the upper side wall 240 of reset slide 216, and thus prevents the valve upper part 202 from being withdrawn out of the valve lower part 204.

As shown in FIG. 25, the slide housing 246 is mounted to a union body male half 250 (eg. affixed thereto). The union body male half 250 is similar to the body 14 of FIG. 3, and is couplable to the stem upper end 46 (FIG. 3) via a union nut 36. At its upper end, the union body male half has an external circumferential ledge 252 against which the lower end of the slide housing abuts, so that the upper end of the union body male half is received within the slide housing 246.

The upper end of the union body male half 250, in combination with the slide housing 246, further defines an internal circumferential ledge 254 at which a slide guide 256 (FIGS. 21 and 22) is supported. The slide guide includes a horizontal upper wall 258, with three cutaway recesses 260 defined in that wall (FIG. 22). Projecting downwardly from that wall are three discrete wall sections 262, which sit adjacent to and locate the slide guide in the upper end of the union body male half 250 (as shown in FIG. 25). In addition, a circular passage 264 is defined through this slide guide, and a downwardly projecting annular flange 266 surrounds that passage. The annular flange 266 helps to support and guide the helical spring 232 (as shown in FIG. 25).

The cut-away recesses 260 are each spaced and sized such that a corresponding reset plate 236 can be received therethrough. This enables the valve upper part to be telescopically extended into the valve lower part, as described below.

Figure 23:
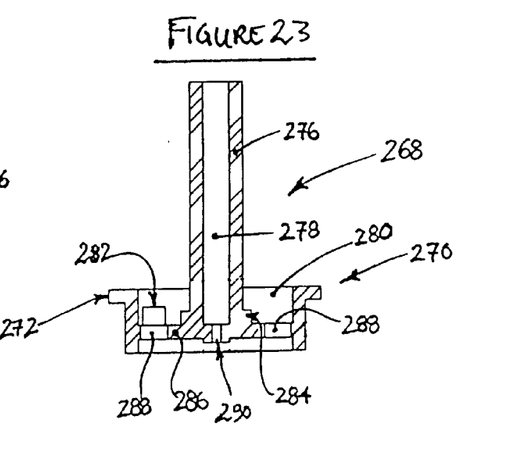
Figure 24:
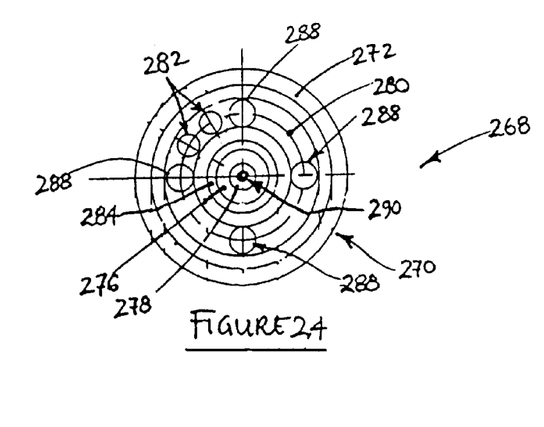

The valve lower part also includes a reset breather rod 268 (FIGS. 23 and 24). The reset breather rod includes a lower body portion 270 having a laterally projecting circumferential flange 272 which abuts and is supported at an internal annular ledge 274 at a lower part of the union body male half 250 (FIG. 25). Extending up from the body portion 270 is a tubular portion 276 having a bore 278 therethrough such that the ball valve 214 sits against the top end of portion 276 after it has been sucked passed the valve seat 226. As can be seen, the tubular portion 276 extends centrally through and generally centres the helical spring 232.

Located within an annular recess 280 in the body portion 270 are two upstanding spigots 282. The spigots capture a lower end of the helical spring between themselves, and between themselves and an external ledge 284 at the base of tubular portion 276 (as best shown in FIG. 25). Thus the spring 232 is attached at its upper end to the valve upper part and at its lower end to the valve lower part.

A central horizontal wall 286 of the body portion 270 has four evenly spaced holes 288 therethrough for the release of fluid (typically air or other gas) from the valve and into the line L when a suction force is applied to the valve.

In addition, a small bore 290 extends through the central wall 286 and opens onto bore 278. A breather seal retaining pin 134 (being the same as the breather pin of FIGS. 10 and 13) has a central spigot 137 that extends up and into the small bore 290 (typically in a push fit or interference fit) to retain a breather sealing member 292 at the other side of body 270, thus sealing the lower end of the valve. The breather sealing member 292 is formed of a flexible or deformable material (and is essentially the same as breather seal 139).

Reference will now be made to FIG. 25, which shows the assembled valve 200 in cross-section, to describe the operation of the valve.

For normal pool pump suction, the ball valve 214 is located in the upper of the two positions shown in FIG. 25. In this position the ball sits within the sealing ring 208 and rests against the valve seat 226. Typically the ball valve sits against the seat under the influence of gravity and/or suction generated in the valve by pool water flowing in line L. No ambient air passes through the valve in this orientation.

When there is a blockage in line L (eg. because of a body or debris becoming attached at inlet I) a vacuum is generated in line L, and the valve 200 then comes into operation. The ball valve 214 is sucked passed the valve seat 226 and drops into a lower ball capturing chamber 298. Once in this position a fluid, typically air, can flow into and through the valve via cap 154. The air flows through the air vent holes 156, through the sealing ring 208, around the ball valve 214 in chamber 298, then flowing between and around the coils of spring 232, around the outside of the tubular portion 276, through the union body male half 250, into the annular recess 280 of body portion 270, and thence through the holes 288. In so flowing, the air deflects the breather sealing member 296 away from the body portion, and then flows into line L. This causes the pump to lose prime, and this releases the vacuum in line L so that the body or debris can be freed from the inlet I.

Advantageously, in accordance with this embodiment of the invention, the valve has a reset mechanism, which enables the ball valve to be restored to its original upper position so that the valve is ready for operation again. In this regard, and as described above, the valve upper part is rotatable and telescopically extendable into the valve lower part to recapture the ball valve 214 above valve seat 226.

Specifically, a user typically grasps the cap 154 and rotates it anticlockwise. This anticlockwise movement is translated via the cap extension piece 102 and the sealing ring 208 to the reset slide 216.

In one mode of operation, the valve upper part can be set in a "charged" orientation whereby the reset plates 236 A, B and C extend partly into respective cut-away recesses 260, so that the plates abut a respective edge of each cut-away recess 260 at their latching recess 238. In this orientation, the spring has been partly wound or twisted.

In another mode of operation, rotation of the reset slide is such as to cause the reset plates 236 A, B and C to move across the upper wall 258 of the slide guide, until the plates completely align above their respective cut-away recesses 260. However, during this rotation, a user can simultaneously push down on the cap 154, and will then detect that the plates are moving into alignment with their respective cut-away recesses, when the plates drop down partially into those recesses as the slide guide upper wall 258 abuts with the plates at the latching recesses 238 In either mode, the rotation of cap 154 twists spring 232.

In any case, continued rotation of the cap eventually allows for each reset plate 236 to be urged downwardly into its respective cut-away recess 260, thus enabling the valve upper part to be telescopically extended into the valve lower part.

When the valve upper part is telescopically extended in this manner, the helical spring is compressed whilst the ball valve 214 is maintained in the ball capturing chamber 298. Eventually the valve seat 226 engages and is then forced over and around the ball valve 214. The user continues to push down on the valve upper part, until the annular flange 228 abuts the upper wall 258 of slide guide 256. This abutment indicates to the user that the ball valve 214 is now sitting above the valve seat 226, and that the user may now release the cap, so that the cap is urged back and upwardly by the compressed helical spring 232.

Eventually the reset plates 226 pass out of their respective cutaway recesses 260 and are located above the slide guide 256 so that the cap can be rotated back to its original (start) position. In this regard, the twist in the helical spring 232 re-rotates the valve upper part 202 back to its original position.

In this manner, a user does not need to discard or dismantle the valve after it has been "tripped". However, typically after many such reset operations, the valve seat loses its shape memory and is permanently deformed, so as that it can no longer provide an effective seal at the valve seat. At this time, the valve is either discarded, or can be deconstructed or dismantled and the valve seat 226 replaced.

Whilst the invention has been described with reference to a number of preferred embodiments, it should be appreciated that the invention can be embodied in many other forms.

What is claimed is:

1. A vacuum release valve for positioning on a line between a pool suction inlet and a pump for pumping pool liquid from the inlet and along the line, the vacuum release valve including a valve member that is urged by the pump into a sealing position during normal pumping of pool liquid from the inlet to the pump and such that pool liquid does not flow through the vacuum release valve;

wherein the vacuum release valve is adapted for location in an auxiliary line located laterally to the line extending between the inlet and pump such that, when pool liquid is drawn past the auxiliary line, the suction induced in the auxiliary line has the effect of drawing the valve member against the seat;

wherein, when a predetermined level of vacuum is induced in the line, the valve member is moved out of the sealing position by the vacuum so that a fluid is allowed to flow through the vacuum release valve to release the vacuum; and wherein the seat is adapted to only allow the valve member to move therepast once the predetermined level of vacuum has been induced in the line, the seat being formed from a resilient but deformable material, which deforms as the member passes but restores to its former shape once the member has passed.

2. A valve as claimed in claim 1 wherein the valve member is a ball and the seat is in the form of an annular inwardly protruding shoulder or sealing ring in the valve, which engages an underside of the ball but such that the ball can move therepast only when the predetermined level of vacuum is reached.

3. A valve as claimed in claim 1 wherein the fluid is ambient air.

4. A valve as claimed in claim 1 wherein the valve is a one way valve.

5. A vacuum release valve for positioning on a line between a pool suction inlet and a pump for pumping liquid from the inlet and along the line, the vacuum release valve including a valve member that is urged by the pump into a sealing position during normal pumping of pool liquid from the inlet to the pump and such that pool liquid does not flow through the vacuum release valve;

wherein the vacuum release valve is adapted for location in an auxiliary line located laterally to the line extending between the inlet and pump such that, when pool liquid is pumped past the auxiliary line, a partial vacuum is induced in the auxiliary line, having the effect of drawing the valve member against the seat;

wherein the seat is adapted to only allow the valve member to move therepast once the predetermined level of vacuum has been induced in the line, the seat being formed from a resilient but deformable material, which deforms as the member passes but restores to its former shape once the member has passed, wherein, when the valve member is a ball, the seat is in the form of an annular inwardly protruding shoulder or sealing ring in the valve, which engages an underside of the ball but such that the ball can move therepast only when the predetermined level of vacuum is reached;

wherein, when a predetermined level of vacuum is induced in the line, the valve member is moved out of the sealing position by the vacuum so that a fluid is allowed to flow through the vacuum release valve to release the vacuum.

6. A vacuum release valve for positioning on a line between a pool suction inlet and a pump for pumping pool liquid from the inlet and along the line, the vacuum release valve including a valve member that is urged by the pump into a sealing position during normal pumping of pool liquid from the inlet to the pump and such that pool liquid does not flow through the vacuum release valve;

wherein the vacuum release valve is a one way ball valve, with the valve member being a ball, such that during normal pumping of pool liquid the ball seals fluid flow across the valve by sitting against a valve seat, and is only moved away from the seat by the fluid when the predetermined level of vacuum is induced in the line;

wherein, when a predetermined level of vacuum is induced in the line, the ball is moved out of the sealing position by the vacuum so that a fluid is allowed to flow through the vacuum release valve to release the vacuum, and the ball is drawn past the seat and into a ball capturing chamber, and wherein an upper part of the valve can be rotated relative to a lower fixed part of the valve and, at a given rotational position, the upper part can then be moved downwardly relative to the lower part such that the valve seat passes over the ball in the ball capturing chamber to once again position the ball at the seat, and the upper part can then be moved upwardly relative to the lower part so that the valve is again ready for use.

7. A valve as claimed in claim 6 wherein the upper part is urged downwardly against a spring positioned between the upper and lower parts, which the spring tends to urge the upper part away from the lower part and move it up once the ball has again been positioned at the seat.

8. A valve as claimed in claim 6 wherein the fluid is ambient air.

9. A valve as claimed in claim 6 wherein the valve seat is adapted to only allow the valve member to move therepast once the predetermined level of vacuum has been induced in the line, the seat being fanned from a resilient but deformable material, which deform as the member passes but restores to its former shape once the member has passed.

10. A valve as claimed in claim 6, wherein the seat is in the form of an annular inwardly protruding shoulder or sealing ring in the valve, which engages an underside of the ball but such that the ball can move therepast only when the predetermined level of vacuum is reached.

11. A valve as claimed in claim 6 that is adapted for location in an auxiliary line located laterally to the line extending between the inlet and pump such that, when pool liquid is pumped past the auxiliary line, a partial vacuum is induced in the auxiliary line, having the effect of drawing the valve member against the seat.

12. A vacuum release valve for positioning on a line between a pool suction inlet and a pump for pumping pool liquid from the inlet and along the line, the vacuum release valve including a valve member that is urged by the pump into a sealing position during normal pumping of pool liquid from the inlet to the pump and such that pool liquid does not flow through the vacuum release valve;

wherein the vacuum release valve is a one way ball valve, with the valve member being a ball, such that during normal pumping of pool liquid the ball seals fluid flow across the valve by sitting against a valve seat, and is only moved away from a seat by the fluid when the predetermined level of vacuum is induced in the line;

wherein, when a predetermined level of vacuum is induced in the line, the valve member is moved out of the sealing position by the vacuum so that a fluid is allowed to flow through the vacuum release valve to release the vacuum;

wherein, when the predetermined level of vacuum is reached, the ball sitting at the valve seat is drawn past the seat and into a ball capturing chamber, and wherein an upper part of the valve can be rotted relative to a lower fixed part of the valve and, at a given rotational position the upper part can then be moved downwardly relative to the lower part such that the valve seat passes over the ball in the ball capturing chamber to once again position the ball at the seat, and the upper part can then be moved upwardly relative to the lower part so that the valve is again ready for use, wherein the upper part is urged downwardly against a spring positioned between the upper and lower parts, which spring tends to urge the upper part away from the lower part and move it up once the ball has again been positioned at the seat.

* * * * *

UNITED STATES PATENT AND TRADEMARK OFFICE
CERTIFICATE OF CORRECTION

PATENT NO. : 6,687,923 B2
DATED : February 10, 2004
INVENTOR(S) : Dick et al.

It is certified that error appears in the above-identified patent and that said Letters Patent is hereby corrected as shown below:

Title page,
Item [*] Notice, please delete information and add: -- Subject to any disclaimer, the term of this patent is extended or adjusted under 35 U.S.C. 154(b) by 0 days --

Signed and Sealed this

Twenty-sixth Day of July, 2005

JON W. DUDAS
*Director of the United States Patent and Trademark Office*